Dec. 15, 1970  M. C. KING  3,547,511
RECORDING HOLOGRAMS OR INTEGRAL PHOTOGRAPHS
WITH A WIDE ANGLE VIEW
Filed March 13, 1968  2 Sheets-Sheet 1

INVENTOR
M. C. KING
BY
*Roderick B. Anderson*
ATTORNEY

Dec. 15, 1970  M. C. KING  3,547,511
RECORDING HOLOGRAMS OR INTEGRAL PHOTOGRAPHS
WITH A WIDE ANGLE VIEW
Filed March 13, 1968  2 Sheets-Sheet 2

United States Patent Office 3,547,511
Patented Dec. 15, 1970

3,547,511
RECORDING HOLOGRAMS OR INTEGRAL PHOTOGRAPHS WITH A WIDE ANGLE VIEW
Michael C. King, Basking Ridge, N.J., assignor to Bell Telephone Laboratories, Incorporated, Murray Hill, N.J., a corporation of New York
Filed Mar. 13, 1968, Ser. No. 712,650
Int. Cl. G02b 27/22; G03b 35/02, 37/02
U.S. Cl. 350—3.5
14 Claims

ABSTRACT OF THE DISCLOSURE

A method is described for recording wide angle views of three-dimensional objects on holograms or integral photographs of arbitrary dimensions. For example, in forming a hologram of the object, a mask with one transparent vertical region is positioned in front of a flat photographic plate. After exposure of the photographic plate, the mask is translated by one slit width along the face of the plate, and the object rotated a small amount about its vertical axis. A second exposure is then made. And this process is repeated until the entire plate has been exposed and the object rotated enough to record the desired wide angle view. In viewing the hologram, the reconstructed image can be made to rotate merely by moving one's head from one side of the hologram to the other.

An integral photograph with similar properties is formed by analogous methods.

BACKGROUND OF THE INVENTION

When an object, such as a three-dimensional figure, is illuminated, it modulates the illuminating beam so as to form a beam of light that carries information representative of the object. A recording, called a hologram, can be made of the phase and amplitude of this information-bearing beam by interfering on a recording medium, such as a photographic plate, the wave fronts of the information beam and a reference beam. When the record is properly illuminated, the information-bearing beam is reconstructed and an image of the stored object can therefore be seen. When the stored object is three-dimensional, this image exhibits three-dimensional properties. For example, if a viewer moves his head with respect to the illuminated hologram, the image of the object appears to rotate, and the viewer perceives a different aspect of the object. The maximum amount of apparent rotation, which is called the field of view, is measured in degrees and is directly related to the angle subtended at the object by the recording medium during the recording of the hologram. Typically, the field of view is about twenty degrees.

However, methods have been devised for recording holograms of objects that can be viewed through angles of up to 360 degrees. See, for example, "Cylindrical Holography and Some Proposed Applications," T. H. Jeong, Journal Optical Society America, 57, pp. 1396–1398 (1967) and the references disclosed therein. In these methods the angle subtended at the object by the recording medium is increased by shaping the recording medium in the form of a cylinder open at both ends and located so as to surround the object to be recorded. The object is illuminated by a beam of light entering at one of the open ends of the cylinder formed by the recording medium; and a reference beam is also supplied through an open end. Reconstruction is effected by illuminating the recording medium, still shaped in the form of an open-ended cylinder, through one of the open ends; and a viewer can observe the image from any of its sides, or angles, merely by varying his position with respect to the cylindrical recording medium.

There are, however, several disadvantages with this technique. First, the object must be illuminated from directions that are almost ninety degrees from the normal to the film. This can produce unwanted shadows across the object. Second, the size of the film is a function of the size of the object because the film must surround the object. Third, the film must be placed back in a cylindrical geometry before it is illuminated to reconstruct the image because large distortions are encountered if the reconstruction is made from a flat surface. A cylindrical reconstruction geometry, however, is frequently inconvenient. For example, to reconstruct the image of a three-dimensional figure such as an artifact or an intricate molecule from a plate in a book, it is much more convenient to illuminate and view a flat plate than a strip of film that must be rolled into a cylinder before it can be viewed.

SUMMARY OF THE INVENTION

Accordingly, it is an object of my invention to provide a hologram with a wide angle view.

And it is still a further object to provide a non-cylindrical hologram with a wide angle view.

These and other objects of my invention are accomplished during the recording process by effective increasing the angle subtended at the object by the recording medium. In practice, a single hologram is formed comprised of several small, vertical strip holograms of different views of the object. A mask with one vertical transparent region is placed in front of a flat recording medium. The object is then illuminated and a segment of the recording medium exposed, following well-known hologram recording procedures. After this exposure, the mask is translated by one slit width across the face of the plate, and the object is rotated a small amount about its vertical axis. A second segment of the recording medium is then exposed. And this process is repeated until the entire recording medium has been exposed, segment by segment, and the object rotated enough to record the desired wide angle view.

The necessary steps are then taken to preserve what has been recorded on the recording medium, the resulting permanent record being called a hologram. From what has been detailed above about the recording process, it should be apparent that this hologram is composed of an array of vertical hologram segments, each of which segments is a record of a different view of the object. The hologram is then illuminated in accordance with standard practices for illuminating flat holograms and is observed. In viewing the hologram, the reconstructed image can be made to rotate about its vertical axis merely by moving one's head from one side of the hologram to the other because each segment of the hologram is a recording of a different view of the object.

As pointed out in the aforementioned article of T. H. Jeong, wide-angle-view recordings can also be made by the methods of integral photography, which are detailed in greater extent in such articles as H. E. Ives, "Optical Properties of a Lippmann Lenticulated Sheet," Journal Optical Society America, 21, 171 (1931). One simply uses a fly's eye lens positioned in a cylindrical configuration about the object to be photographed. With my invention, however, it is possible to use a flat fly's eye lens to make the integral photograph. The technique used is similar to that used to form a hologram; however, no reference beam is used and a fly's eye lens images the light from the object onto a recording medium.

It is also possible to practice my invention using a curved recording medium although such practice is likely to complicate the viewing process. The technique of rotation and masking works just as well with a curved surface as it does with a flat surface to increase the effective angle subtended at the object by the recording medium during the recording process.

BRIEF DESCRIPTION OF THE DRAWING

These and other objects and features of my invention will be more readily understood from the following detailed description taken in conjunction with the accompanying drawing in which.

DETAILED DESCRIPTION OF THE DRAWING

A preliminary definition

From its very beginning, holography was not limited to the recording of the phase and amplitude of a modulated beam from an object illuminated with visible light. The first work in holography was an effort to record objects "illuminated" by X-rays; and recordings have been made of objects illuminated by microwaves, infra-red frequencies, visible light and ultraviolet frequencies. Techniques have also been developed to make holograms of objects "illuminated" by acoustic waves. However, as a matter of convenience, and to some extent as a matter of custom in this art, in this specification I have chosen to describe the hologram formation process in terms of the exposure of a recording medium by light. It is to be understood that my use of the word "light" and similar words is intended to embrace the use of any form of "illumination," visible or invisible, in a hologram forming technique and is not limited to the use of visible light. Similarly, the description of the hologram illumination process is intended to embrace the use of any form of illumination that produces a detactable information beam and is not limited to the use of visible light.

Integral photography has more traditionally been limited to photography with visible light. However, within the limits imposed by the frequency transmission characteristics of the fly's eye lens, integral photographs can be made or illuminated using frequencies other than those of visible light. Hence, the use of the word "light" and similar words is also intended to embrace the use of any form of "illumination," visible or invisible, in integral photography.

FIRST EMBODIMENT OF THE INVENTION

Figure 1:
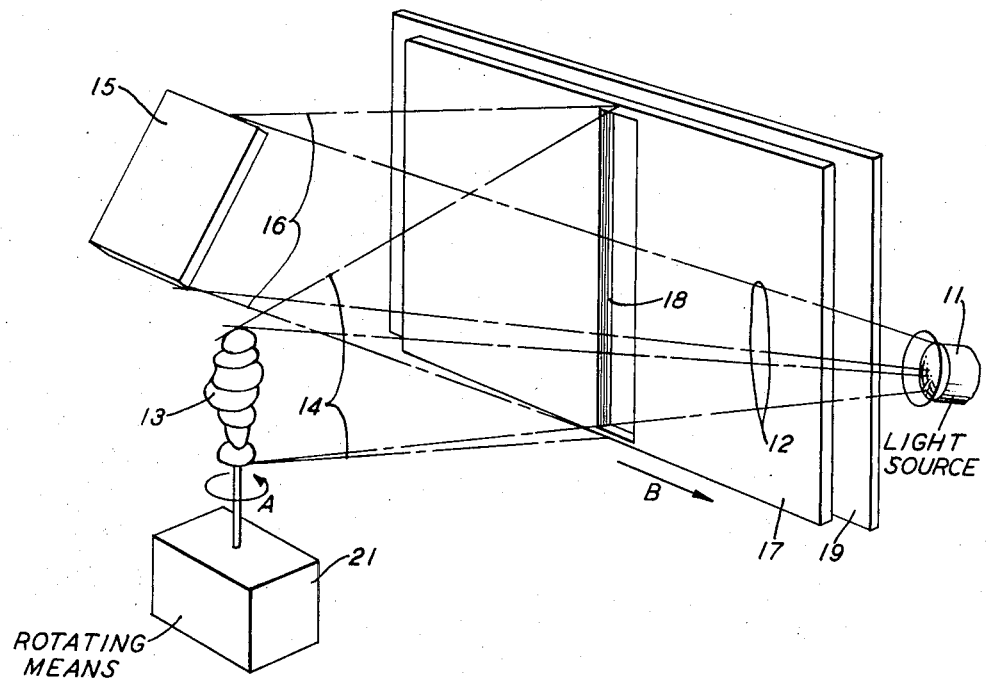
FIG. 1 is a schematic illustration of apparatus used to form a hologram in one embodiment of my invention.

Referring now to FIG. 1, there is shown an illustrative embodiment of one feature of the applicant's invention. The apparatus comprises a coherent light source 11, a three-dimensional object 13 about which information is to be stored, a reference beam mirror 15, a mask 17 in which is a vertical transparent region or slit 18, and a recording medium 19, typically a photographic plate, located immediately behind mask 17. Illustratively, object 13 is mounted on rotating means 21, and light source 11 is positioned alongside recording medium 19.

To form a set of interference fringes containing information about object 13, an information-bearing, modulated beam 14 is created by reflecting off object 13 part of a light beam 12 emanating from source 11. Information beam 14 is then incident on mask 17 where it interferes with a reference beam 16 formed by reflecting another part of light beam 12 off mirror 15. Except in the region of slit 18, the light from these two interfering beams is stopped. However, the light in the region of slit 18 transmits mask 17 and is incident on a segment of recording medium 19.

After a suitable exposure of recording medium 19, object 13 is rotated through a small angle about its vertical axis by rotating means 21; and mask 17 is translated in a horizontal direction along the face of the recording medium a distance equal to the width of slit 18. The direction of rotation is opposite to the direction of translation, as is indicated by arrows A and B, in order to produce the greatest possible rotation of the image across the recording medium. A second segment of the recording medium is then exposed by directing light beam 12 onto object 13 and mirror 15 to form information and reference beams 14 and 16 that interfere on mask 17 and expose the segment of recording medium 19 located behind slit 18.

Figure 2:
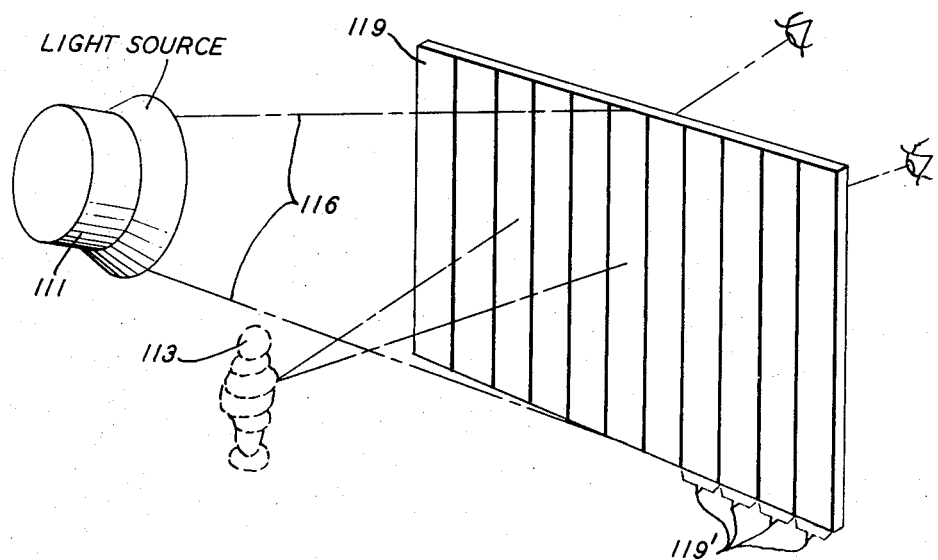
FIG. 2 is a schematic illustration of apparatus used to illuminate the hologram formed by the apparatus of FIG. 1.

Additional exposures are made following the same procedure of small rotations and mask translations until the entire recording medium is exposed and the object is rotated enough to provide a record with the desired width in the angle of view. The necessary steps are then taken to form a permanent record of the interference patterns that are recorded on recording medium 19; and this record, which is called a hologram, is viewed with the apparatus of FIG. 2. This apparatus comprises a coherent light source 111 and the hologram, shown as element 119. To view hologram 119, a reference beam 116 is directed from light source 111 to hologram 119; and the viewer, situate as indicated, observes a virtual image 113 of object 13. Because of the recording process detailed in conjunction with FIG. 1, it should be apparent that hologram 119 is composed of an array of vertical hologram segments 119', each of which segments is a record of a different view of the object. Consequently, each eye of the viewer ordinarily records a different view of the object, a phenomenon that is discussed further below; and as the viewer shifts his eyes along the horizontal direction of the hologram, he sees different views of the object, just as if the image were rotating.

In practicing my invention I have formed several different wide-angle holograms using various arrangements of the elements, different slit widths and different size photographic plates. In one case, the distance from the object to the photographic plate was 33 centimeters and the width of the hologram that was formed was 10 centimeters. The slit width was 2.5 millimeters and the amount of rotation of the object between exposures was 3.75 degrees. In a second example, the distance from object to photographic plate was again 33 centimeters, the width of the hologram was 10 centimeters and the amount of rotation of the object was 3.75 degrees; however, the width of the slit was only 1.25 millimeters. In a third example, the distance of the object from the photographic plate was 30 centimeters, and the width of the hologram was 22 centimeters. The width of the slit was 2.1 millimeters and the amount of rotation of the object between each exposure was 3.75 degrees.

In the first two examples, the recording medium subtends an angle at the object that is equal to $$2 \tan \frac{5}{33} \approx 17° \; 14'$$

However, the total view that is recorded in the first example is approximately $$3.75° \left(\frac{100}{2.5}\right) = 150°$$

and in the second example, it is $$3.75° \left(\frac{100}{1.25}\right) = 300°.$$

In the third example, the angle the recording medium subtends is $$2 \tan \frac{11}{30} \approx 40° \; 16'$$

but the total angle of view that is recorded is approximately $$3.75° \left(\frac{220}{2.1}\right) \approx 393°$$

As one might expect, it was observed that a decrease in the width of the slit, and hence a decrease in the width of the individual hologram strip that was recorded, causes a decrease in the resolution of the reconstructed image. However, it can be shown that there is little loss of resolution if the width of the slit, and hence of the individual hologram strip, is larger than $dA/(d+D)$, where $d$ is the distance of the reconstructed image of the object from the hologram, where $A$ is the aperture of the viewing system, for example, the diameter of the pupil of the eye or of the lens of a camera, and where $D$ is the distance of the viewer from the hologram. Assuming that the diameter of the pupil of the viewer's eye is three millimeters and that the viewer is twice as far from the hologram as the image, the slit width should be at least one millimeter.

In viewing an object that is relatively close by, each eye of the viewer records a slightly different image because each eye sees the object from a slightly different angle of view. For example, if the object viewed is forty centimeters from the viewer and if the distance between the eyes is six centimeters, the angular difference is almost nine degrees. The two different images that are recorded, however, are fused in the brain so that the viewer is aware of only one image. In viewing an ordinary hologram, each eye of the viewer likewise records only a slightly different image because a properly illuminated hologram is a faithful reconstruction of exactly what would be seen if the original object were being viewed.

However, because of the rotation of the object, the masking and the mask shifting during the recording process of my invention, each eye of the viewer there records a considerably different image. For example, if the viewer is twice as far in FIG. 2 from hologram 119 as image 113 is and if the horizontal distance between the viewer's eyes is six centimeters, then by elementary geometry one eye of the viewer sees the image through a hologram segment 119' located two centimeters from a second hologram segment 119' through which the other eye of the viewer sees the image. However, if during the hologram recording process the object is rotated 3.75 degrees between each exposure and if the distance the mask is translated between each exposure is 2.5 millimeters, it is apparent that the effective angular separation of the eyes, or the angle of view is thiry degrees.

Experiments were performed to determine the maximum angular separation for which the brain can fuse the different images formed by the eye. Several observers were asked to view a number of holograms and to determine the distance from the hologram at which the images could be made to fuse. From this information it was determined that the maximum angle between the images at which the images would fuse was $38° \pm 1°$. From the geometry of the arrangement, it was then calculated that the maximum rotation between exposures for which fusion takes place, $R_{max}$, is given by $$R_{max} = \left(38° \pm 1° - 2 \tan^{-1} \frac{3 \text{ cm.}}{D+d}\right) \frac{(D+d)T}{d \; 6 \text{ cm.}}$$

where $d$ is the distance in centimeters from the object to the hologram, $D$ is the distance in centimeters from the hologram to the viewer and $T$ is distance in centimeters that the mask is translated between exposures. In this expression, the $\tan^{-1}$ term is the angle subtended at the image by the two eyes of the viewer under normal circumstances, six centimeters being assumed to be the distance between the pupils, and $(D+d)/(d6)$ is a measure of the geometry of the viewing arrangement.

With a variation on the illumination method described above, it is possible to eliminate any need for concern about image fusion. In this case, the hologram is formed as described in FIG. 1 but it is rotated by ninety degrees about its normal before it is illuminated for viewing. In this way, both eyes view the image through a single hologram segment and therefore both eyes see the same image. To view the object from a different angle, the observer merely moves his eyes in a vertical direction instead of in the horizontal direction described in viewing the hologram in FIG. 2.

The illustrations presented thus far enable the viewer to see the reconstructed image from wide angles in a horizontal direction. To form an image that can be viewed from wide angles in a vertical direction, the hologram is formed with a mask having a horizontal rather than a vertical transparent region and the mask is moved in a vertical direction while the object is rotated about a horizontal axis. And in general, to form an image that can be viewed from wide angles in a given direction, the mask is moved in the given direction while the object is rotated about an axis perpendicular to the direction of motion of the mask and in a plane parallel to the recorded medium.

It is also possible to form a hologram that reconstructs an image that can be viewed from wide angles in both the horizontal and vertical directions. In this case the mask has a transparent region that is a small square or rectangle and is scanned back and forth across the recording medium in such a way as to expose all of it. Illustratively, the mask is translated in a horizontal direction across the recording medium, thereby exposing a horizontal stripe on the medium, while the object is rotated about its vertical axis. Consequently, a record is made that has a wide angle view of the object in the horizontal direction but a narrow angle view in the vertical direction. To increase the angle of view in the vertical direction, the mask is translated after the completion of the first row in a vertical direction a distance equal to the vertical dimension of its transparent region and the object is rotated a small amount about its horizontal axis. A second row is then exposed. And following the same procedures, as many more rows are exposed as are required to give the desired wide angle view in the vertical direction.

SECOND EMBODIMENT OF THE INVENTION

Figure 3:
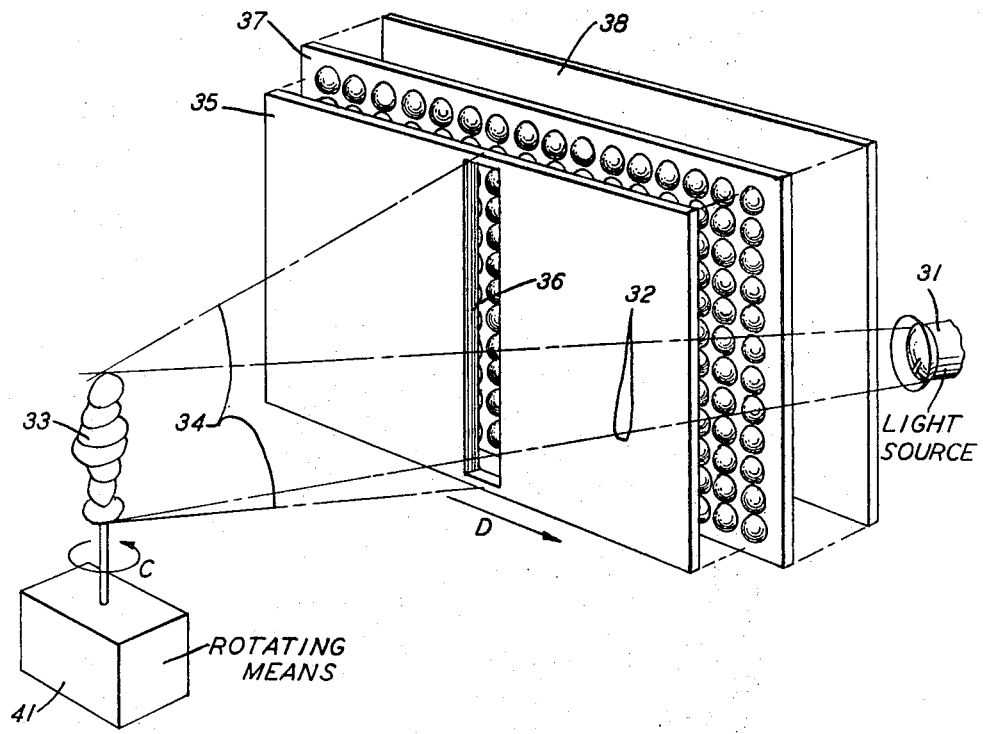
FIG. 3 is a schematic illustration of apparatus used to form an integral photograph in a second embodiment of my invention.

Referring now to FIG. 3 there is shown an illustrative embodiment of a second feature of applicant's invention. The apparatus comprises a light source 31, which need not be coherent, a three-dimensional object 33 about which information is to be stored, a mask 35 in which is a vertical transparent region or slit 36, a fly's eye lens 37 and a recording medium 38, typically a photographic plate, located in the image plane of lens 37. Illustratively, object 33 is mounted on rotating means 41. In practice, fly's eye lens 37 is mounted directly behind mask 35; and because the image plane of lens 37 is quite close to the lens, photographic plate 38 is located right behind lens 37. For convenience, however, these elements are shown in FIG. 3 in a slightly exploded view.

To form an integral photograph of object 33, an information-bearing, modulated beam 34 is created by reflecting off object 33 part of a light beam 32 emanating from source 31. Information beam 34 is then incident on mask 35. Except in the region of slit 36 the light in this region is stopped. However, in the region of slit 36 the light transits mask 35 and is imaged by fly's eye lens 37 onto a segment of recording medium 38.

After a suitable exposure of recording medium 38, object 33 is rotated through a small angle about its vertical axis by rotating means 41; and mask 35 is translated in a horizontal direction along the face of the recording medium a distance equal to the width of slit 36. The direction of rotation is opposite to the direction of translation, as is indicated by arrows C and D, in order to produce the greatest possible rotation of the image across any given area of the recording medium. A second segment of the recording medium is then exposed by directing light beam 32 onto object 33 to form an information beam 34, part of which is imaged by fly's eye lens 37 onto the portion of the recording medium 38 located behind slit 36.

Figure 4:
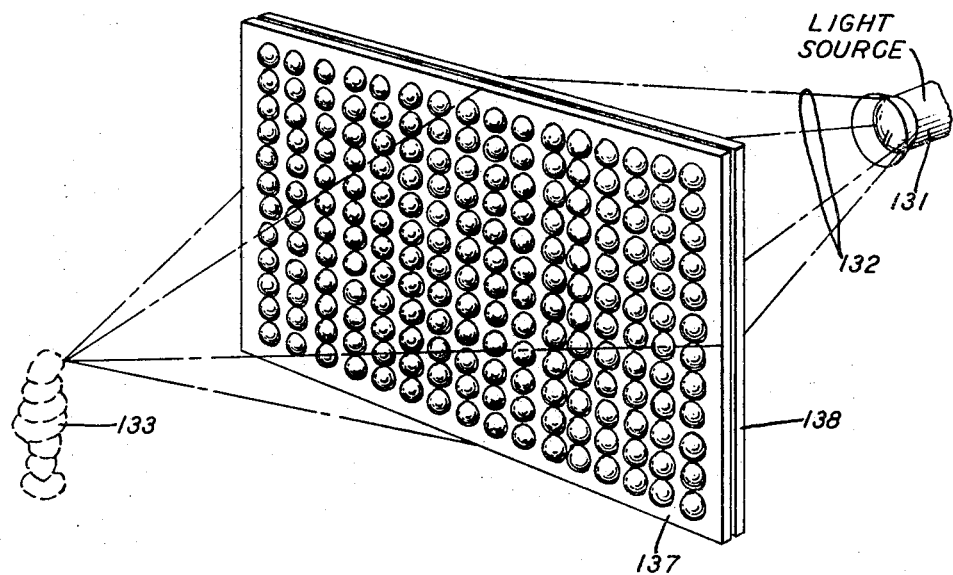
FIG. 4 is a schematic illustration of apparatus used to illuminate the integral photograph formed by the apparatus of FIG. 3.

Additional exposures are made following the same procedure of small rotations and mask translations until the entire recording medium is exposed and the object is rotated enough to provide a record with the desired width in the angle of view. The necessary steps are then taken to form a permanent record of the images that have been formed on recording medium 38; and this record which is called an integral photograph is viewed in the apparatus of FIG. 4. This apparatus comprises a light source 131, which need not be coherent, a fly's eye lens 137 that is the optical equivalent of fly's eye lens 37 of FIG. 3 and the integral photograph shown as element 138. To view photograph 138, a light beam 132 from light source 131 is directed through photograph 138 and fly's eye lens 137; and a real pseudoscopic image 133 of object 33 is observed as indicated. Because of the recording processes detailed in conjunction with FIG. 3, the viewer can move around image 133 and see an image representative of as wide an angle of view of the object as has been recorded.

It will be appreciated that those skilled in the art may devise other arrangements that fall within the spirit and scope of my invention. For example, in FIG. 1 it is possible to rotate light source 11 and photographic plate 19 about object 13 instead of rotating object 13 about its axis; and this might be preferable where object 13 is large and bulky, if not required as in the case where object 13 cannot be rotated. Similarly, although I have described my invention as using a flat recording medium and prefer to use such a medium myself, the invention may also be practiced with a curved recording medium.

What is claimed is:

1. A method for forming a hologram recording of a three-dimensional object that when illuminated will reconstruct an image or series of images having three-dimensional properties representative of a wide angle view of the object, said method comprising the steps of:
    forming a plurality of hologram segments by making a series of exposures of each of a plurality of separate portions of a recording medium with a beam of light that has been modulated by the object, said exposures being made through a transparent region in an otherwise opaque mask;
    translating the mask between each exposure a sufficient distance across the recording medium to cover up the previously exposed portions of the recording medium and rotating between each exposure at least one of the object and the combination comprised of the mask and the recording medium relative to the other to change the angular relationship between the object and the recording medium so as to alter the total angle of view of the object recorded on the recording medium from the angle that the recording medium subtends at the object, the amount of said rotation between each exposure being such that if the recording medium is illuminated after the exposures are made and if each eye of an observer views a different portion of the illuminated recording medium then what is reconstructed from each portion viewed can be formed into a single image of the object.

2. The method of claim 1 wherein:
    the width of a transparent region in the mask is equal to or greater than $dA/(d+D)$, where $d$ is the distance from the reconstructed image to the recording medium, where A is the aperture of any lens system used to view the image and D is the distance of the lens system to the recording medium; and
    the angular rotation in degrees between each exposure is equal to or less than $$\left(38° \pm 1° - 2 \tan^{-1} \frac{3 \text{ cm.}}{D+d}\right) \frac{(D+d) T}{d \, 6 \text{ cm.}}$$

where T is the distance of translation of the mask expressed in centimeters and $d$ and D are defined above and are expressed in centimeters.

3. The method of claim 2 wherein:
    the distances through which the mask is translated between each exposure are substantially equal; and
    the amount of rotation between each exposure of the recording medium and the object relative to each other is substantially equal.

4. The method of claim 3 wherein the distance the mask is translated between each exposure is approximately equal to the width of the transparent region in the mask.

5. The method of claim 3 wherein:
    the mask is translated across the recording medium in a horizontal direction; and
    the object is rotated about its vertical axis.

6. The method of claim 2 wherein the recording that is formed is a hologram made by successively exposing each portion of the recording medium to an interference pattern formed by interfering a coherent reference beam of light with each beam of light that has been modulated by the object, each modulated beam being a coherent beam of light having a constant phase relation with the reference beam of light.

7. The method of claim 2 wherein the recording that is formed is an integral photograph made by successively imaging each beam of light that has been modulated by the object onto a portion of the recording medium.

8. The method of claim 2 wherein the width of the transparent region, the number of exposures and the angular rotation between each exposure are enough that what can be reconstructed from the recording medium represents a view of at least 180 degrees of the object.

9. A method for forming a hologram recording of a three-dimensional object that when illuminated will reconstruct an image or series of images having three-dimensional properties representative of a wide angle view of the object, said method comprising the steps of:
    forming a plurality of hologram segments by making a series of exposures of each of a plurality of separate portions of a recording medium with a beam of light that has been modulated by the object, some of said portions of the recording medium being exposed at different distances from the object; and
    rotating between each exposure at least one of the object about itself and the recording medium about the object to change the angular relationship between the object and the recording medium so as to alter the total angle of view of the object recorded on the recording medium from the angle that the recording medium subtends at the object, the amount of rotation between each exposure being such that if the recording medium is illuminated after the exposures are made and if each eye of an observer views a different portion of the illuminated recording medium then what is reconstructed from each portion viewed can be formed into a single image of the object.

10. The method of claim 9 wherein the width of each portion of the recording medium, the number of exposures and the angular rotation between each exposure are enough that what is reconstructed from the recording medium represents a view of at least 180 degrees of the object.

11. A method for forming a hologram recording of a three-dimensional object and for reconstructing therefrom an image or series of images having three-dimensional properties representative of a wide angle view of the object, said method comprising the steps of:

forming a plurality of hologram segments by making a series of exposures of each of a plurality of separate portions of a recording medium with a beam of light that has been modulated by the object, some of said portions of the recording medium being exposed at different distances from the object;

rotating between each exposure at least one of the object about itself and the recording medium about the object to change the angular relationship between the object and the recording medium so as to alter the total angle of view of the object recorded on the recording medium from the angle that the recording medium subtends at the object, the amount of rotation between each exposure being such that if the recording medium is illuminated after the exposures are made and if each eye of an observer views a different portion of the illuminated recording medium then what is reconstructed from each portion viewed can be formed into a single image of the object; and illuminating the recording medium after the exposures are made to reconstruct therefrom the image or series of images of the object.

12. A hologram recording of a three-dimensional object that when illuminated will reconstruct an image or series of images having three-dimensional properties representative of a wide angle view of the object, said hologram being formed by a method comprising the steps of:

forming a plurality of hologram segments by making a series of exposures of each of a plurality of separate portions of a recording medium with a beam of light that has been modulated by the object, some of said portions of the recording medium being exposed at different distances from the object; and rotating between each exposure at least one of the object about itself and the recording medium about the object to change the angular relationship between the object and the recording medium so as to alter the total angle of view of the object recorded on the recording medium from the angle that the recording medium subtends at the object, the amount of rotation between each exposure being such that if the recording medium is illuminated after the exposures are made and if each eye of an observer views a different portion of the illuminated recording medium then what is reconstructed from each portion viewed can be formed into a single image of the object.

13. A method for forming an integral photograph recording of a three-dimensional object that when illuminated will reconstruct an image or series of images having three-dimensional properties representative of a wide angle view of the object, said method comprising the steps of:

forming a plurality of integral photograph segments by making a series of exposures of each of a plurality of separate portions of a recording medium with a beam of light that has been modulated by the object, some of said portions of the recording medium being exposed at different distances from the object; and rotating between each exposure at least one of the object about itself and the recording medium about the object to change the angular relationship between the object and the recording medium so as to alter the total angle of view of the object recorded on the recording medium from the angle that the recording medium subtends at the object, the amount of rotation between each exposure being such that if the recording medium is illuminated after the exposures are made and if each eye of an observer views a different portion of the illuminated recording medium then what is reconstructed from each portion viewed can be formed into a single image of the object.

14. An integral photograph recording of a three-dimensional object that when illuminated will reconstruct an image or series of images having three-dimensional properties representative of a wide angle view of the object, said integral photograph being formed by a method comprising the steps of:

forming a plurality of integral photograph segments by making a series of exposures of each of a plurality of separate portions of a recording medium with a beam of light that has been modulated by the object, some of said portions of the recording medium being exposed at different distances from the object; and rotating between each exposure at least one of the object about itself and the recording medium about the object to change the angular relationship between the object and the recording medium so as to alter the total angle of view of the object recorded on the recording medium from the angle that the recording medium subtends at the object, the amount of rotation between each exposure being such that if the recording medium is illuminated after the exposures are made and if each eye of an observer views a different portion of the illuminated recording medium then what is reconstructed from each portion viewed can be formed into a single image of the object.

References Cited

UNITED STATES PATENTS 2,448,084   8/1948   Davis _____ 95—15

OTHER REFERENCES

Ives, Jour. of the Optical Soc. of Am., vol. 21, March 1931, pp. 171–176.

Burns et al., The Photographic Jour., vol. 101, Oct. 13, 1961, pp. 273–277.

Leith et al., Scientific American, vol. 212, June 1965, pp. 24–35.

Jeong, Jour. of the Optical Soc. of Am., vol. 57, November 1967, pp. 1396–1398.

DAVID SCHONBERG, Primary Examiner

R. J. STERN, Assistant Examiner

U.S. Cl. X.R.

95—15, 36; 350—130